United States Patent Office 3,385,794
Patented May 28, 1968

3,385,794
STABILIZATION OF FLUORINATION
CATALYSTS
Otto Scherer, Bad Soden, Taunus, and Jürgen Korinth and Peter Paul Rammelt, Hofheim, Taunus, Germany, assignors to Farbwerke Hoechst Aktiengesellschaft vormals Meister Lucius & Bruning, Frankfurt am Main, Germany, a corporation of Germany
No Drawing. Filed June 26, 1964, Ser. No. 378,419
Claims priority, application Germany, June 29, 1963,
F 40,107
8 Claims. (Cl. 252—415)

The present invention relates to the stabilization of fluorination catalysts.

Fluorination catalysts pertaining to the group of chromium oxyfluorides which are obtained for example by fluorinating hydroxides of trivalent chromium such as chromium-(III)-hydroxide or green of chromium hydroxide (Guignet's green), with hydrogen fluoride (as described in U.S. patent application S.N. 248,866, filed on Jan. 2, 1963 in the name of Otto Scherer, Jürgen Korinth and Peter Frisch for "Process and Catalyst for Fluorinating Aliphatic Compounds," now abandoned), or by heating hydrous chromium trifluoride in a current of oxygen, sometimes tend to subside in their activity when aliphatic halogenated carbon compounds, especially those which still contain hydrogen and/or oxygen, are fluorinated in their presence. Among these halogenated carbon compounds, methylene chloride and trichlorethane for example are known for their deactivating action.

It has already been described in U.S. Patent 2,745,886 that such a deactivation of chromium oxyfluoride catalysts can be remedied by an oxygen treatment at temperatures of about 500° C. However, such a measure is effective for a short time only.

Now we have found a process for the treatment of fluorination catalysts of the chromium oxyfluoride group, which comprises passing elementary chlorine over the catalysts at temperatures above 100° C., generally within the range of from 200° C. to 500° C., preferably within the range of from 220° to 400° C.

The catalyst may, if necessary, be subjected to a chlorine treatment in the process in which it is used as a fluorination catalyst; this may be designated as stabilization, provided, of course, that the organic compounds to be subjected to the fluorination process react with chlorine to a small extent only, if any, under the reaction conditions, such as, for example, perhalogenated paraffins or oxygen-containing compounds such as trichloroacetyl chloride, chloral, and the like. The upper limit of the temperature range of the chlorine treatment is that at which the compound to be fluorinated would tend to react with the elementary chlorine or to decompose.

The amounts of chlorine to be added in the fluorination process depend on the organic substance applied and on the reaction temperature. Generally the chlorine is applied in amounts within the range of from 0.1 to 50 mol percent or higher, preferably within the range of from 1 to 20 mol percent of said substance.

If an undesirable chlorination of the compound to be fluorinated is to be expected or if the catalyst has already been deactivated by its use in fluorination reactions the fluorination process is interrupted and chlorine, advantageously in admixture with hydrogen fluoride, is passed over the catalyst in the absence of the organic compound to be fluorinated. This activation process can be repeated from time to time. By treating the fluorination catalysts with chlorine in this manner it has, moreover, become possible in several cases to improve the exchange efficiency also of catalysts that have not subsided in their activity.

In the fluorination of trichloracetyl chloride with hydrogen fluoride in the presence of a chromium oxyfluoride catalyst obtained by fluorinating chromium-(III)-hydroxide and/or green of chromium hydroxide, there are added, for example, preferably 5–20 mol percent of chlorine calculated on the trichloracetyl chloride used. In the corresponding fluorination of chloral preferably 1 to 10 mol percent of chlorine is used.

When the chlorination is carried out in stages, the required amount of chlorine depends on the degree of deactivation and on the temperature at which the chlorination is carried out; generally 1 to 100 grams, preferably 5 to 60 grams of chlorine are used per liter of catalyst and per hour. What has been said above also applies to the reaction period which, in general, is 1 to 8 hours, preferably 2 to 4 hours.

However, smaller amounts of chlorine and/or shorter treatment times may also, at least partly, be successful. Larger amounts of chlorine and longer periods of treatment are not prejudicial in most cases.

When the chlorination is carried out in stages, it is advantageous but not necessary to add hydrogen fluoride; the amount to be added is not critical, it amounts, for example, to 0.1 to 10 times (in parts by weight) the amount of the chlorine applied.

The chlorine treatment is generally carried out at atmospheric pressure. However, chlorination can also be effected at higher pressures when the apparatus is resistant to pressure.

The action of elementary chlorine on the activity of the chromium oxyfluoride catalysts is surprising. The process according to the invention also has the advantage over the hitherto known activation with oxygen at 500° C. that the required temperatures lie approximately within the range of temperature in which the fluorination of organic compounds is usually carried out. Owing to this fact, heating with subsequent cooling of the reaction furnaces can for the most part be avoided in the activation, which measures are time-consuming, cause undesirable interruptions and impair the stability of the catalyst.

The process according to the invention constitutes an important advance in the art in that it considerably prolongs the life of the above-cited group of catalysts even in the case of using unstable compounds. The process according to the invention teaches, moreover, how to prepare catalysts having a definite reduced activity by regenerating deactivated catalysts with small amounts of chlorine only until the desired activity has been obtained.

The following examples serve to illustrate the invention, but they are not intended to limit it thereto:

EXAMPLE 1

A chromium oxyfluoride catalyst prepared by fluorinating green of chromium hydroxide and having a volume of about 1 liter, brought about a Cl-exchange of 2.84 in the fluorination of $CCl_4$ with HF (molar ratio 1:5) at 350° C., i.e., of the 4 Cl-atoms of $CCl_4$, 2.84 were exchanged on an average, which was determined by titration of the hydrochloric acid formed. With the use of methylene chloride (molar ratio $CH_2Cl_2$:HF=1:3.3), an exchange of 1.27 was obtained. After the catalyst had been used for the fluorination of methylene chloride for about 50 hours, partly at 400° C., the exchange at 350° C. amounted to 1.01 for methylene chloride and to 1.87 for $CCl_4$.

Then 250 grams $Cl_2$ and 261 grams HF were passed over the catalyst at 300° C. during the course of 4 hours. After this treatment the exchange for $CCl_4$ increased to 2.45.

When the catalyst was once more treated at 400° C. with 242 grams $Cl_2$ and 233 grams HF in the course of 4 hours, the exchange for $CCl_4$ increased to 2.9 and for methylene chloride to 1.22, i.e., the former values had practically been attained.

EXAMPLE 2

A chromium oxyfluoride catalyst prepared by fluorinating chromium-(III)-hydroxide and having a volume of about 1 liter brought about a Cl-exchange of 2.95 in the fluorination of $CCl_4$ with HF (molar ratio 1:3.1) at 280° C. When attempting to fluorinate other chlorinated aliphatics in the presence of this catalyst, the catalyst was impaired and the Cl-exchange for $CCl_4$ decreased to 2.56.

Then 155 grams $Cl_2$ and 130 grams HF were passed over the catalyst at 200° to 300° C. during the course of 2.5 hours. After this treatment the exchange for $CCl_4$ was 2.94.

EXAMPLE 3

A catalyst as described in Example 2 brought about a Cl-exchange of 2.93 in the fluorination of chloral to yield fluoral. While the catalyst was used in this reaction the exchange value decreased to 2.80.

264 grams $Cl_2$ and 340 grams HF were passed over the catalyst at 200° to 300° C. in the course of 5 hours. Under the same reaction conditions as described above, the Cl-exchange amounted again to 2.93.

EXAMPLE 4

A chromium oxyfluoride catalyst obtained by mixing the catalysts prepared according to Examples 1 and 2 and having a volume of about 1 liter brought about a Cl-exchange of 3.8 in the fluorination of trichloracetyl chloride with HF (molar ratio 1:5.6) at a reaction temperature of 240° C., which was determined by titrating the hydrochloric acid formed.

While this Cl-exchange normally decreases to about 3.3 after the catalyst has been used for about 70 hours the Cl-exchange remained at the same level even after a period of 230 hours when about 4% by weight of $Cl_2$ calculated on the trichloracetyl chloride applied was introduced continuously into the reaction zone.

EXAMPLE 5

For the preparation of fluoral, 80 grams HF, 120 grams chloral, 3 grams $Cl_2$ were passed per hour at a reaction temperature of 200° C. over a chromium oxyfluoride catalyst prepared as described in Example 2. The Cl-exchange amounted to 2.97. After a period of 120 hours the Cl-exchange amounted to 2.99.

Without the addition of chlorine the Cl-exchange amounted to 2.90 and decreased to 2.83 after a period of 32 hours.

We claim:

1. In a process of improving a chromium oxyfluoride catalyst the step of activating or stabilizing said catalyst by passing chlorine over said catalyst at a temperature from 100° C. to 500° C.

2. In a process of activating or stabilizing said catalyst according to claim 1 the improvement wherein chlorine is passed over said catalyst at a temperature from 100° C. to 500° C. in presence of hydrogen fluoride.

3. In a process of improving a chromium oxyfluoride catalyst the step of activating or stabilizing said catalyst according to claim 1 wherein chlorine is passed over said catalyst at a temperature from 100° C. to 500° C. in presence of hydrogen fluoride and a halogenated carbon compound which is fluorinated by means of said catalyst.

4. In a process for improving the catalyst according to claim 1 wherein the temperature is from 220° C. to 400° C.

5. In a process of improving a fluorinated chromium-(III)-hydroxide catalyst the step of activating or stabilizing said catalyst according to claim 3 wherein 0.1 to 50 mole percent of chlorine is used per mole of the halogenated carbon compound.

6. The process according to claim 5 wherein the halogenated compound is trichloroacetyl chloride or chloral.

7. The process according to claim 1 wherein per liter of catalyst, 1 to 100 grams of chlorine are passed over said catalyst within 1 to 8 hours.

8. The process according to claim 2 wherein the hydrogen fluoride is 0.1 to 10 times, in parts by weight, of the chlorine used.

References Cited

UNITED STATES PATENTS

| 1,293,863 | 2/1919 | Morton | 252—415 |
| 1,617,533 | 2/1927 | Mahler | 252—415 |
| 2,113,028 | 4/1938 | Kuentzel | 252—415 |
| 2,407,701 | 9/1946 | Jones et al. | 252—415 |
| 2,191,981 | 2/1940 | De Jahn | 252—441 X |
| 2,745,886 | 5/1956 | Ruh et al. | 260—653.7 |
| 2,892,000 | 9/1959 | Skiles | 252—441 X |
| 2,926,131 | 2/1960 | Hepp et al. | 252—441 |
| 3,147,229 | 9/1964 | Hinlicky et al. | 252—441 X |

OTHER REFERENCES

Proceeding of the Chem. Society, July 1963, p. 205, J. H. Simons book, vol. 5, 1964 ed., p. 60.

DANIEL E. WYMAN, *Primary Examiner.*

PATRICK P. GARVIN, EDWARD E. STERN, *Examiners.*

L. G. XIARHOS, *Assistant Examiner.*